United States Patent Office 2,966,519
Patented Dec. 27, 1960

2,966,519

STABILIZED BENZIDINES

Francis W. Cashion, Hamburg, N.Y., assignor to Allied Chemical Corporation, a corporation of New York No Drawing. Filed Mar. 21, 1957, Ser. No. 647,507

8 Claims. (Cl. 260—571)

This invention relates to benzidines which are stable against discoloration upon storage and to a process for effecting such stabilization.

As employed herein, including the claims, the terms "benzidines" and "a benzidine" denote and include benzidine itself (4,4'-diaminobiphenyl) and its lower alkyl, lower alkoxy, and halogen derivatives.

Benzidines are ordinarily manufactured commercially by an acid rearrangement (e.g., with mineral acids such as hydrochloric acid or sulfuric acid) of the corresponding hydrazobenzenes which themselves have been obtained by reduction of more highly oxidized nitrogen compounds (such as, a nitrobenzene, an azobenzene, or an azoxybenzene).

Thus it is known to reduce nitrobenzene, nitrotoluenes, chloronitrobenzenes, nitroanisoles, nitrophenetoles and their related azoxy and azo compounds to the corresponding hydrazobenzenes by alkaline reduction (e.g., by reaction with zinc and caustic alkali, or by heating with alcoholic caustic alkali at a high temperature and at superatmospheric pressure), or by electrolytic reduction. More recently the reduction has been carried out with alcoholic caustic alkali promoted by the use of naphthoquinones and other naphthoquinoid reduction promoters (U.S.P. 2,645,636 and 2,765,301) and by reduction with aldehydes and/or reducing sugars and caustic alkali promoted by the use of naphthoquinoid reduction promoters (U.S.P. 2,794,046 and 2,794,047).

The hydrazobenzenes are then rearranged by reaction with a strong acid (e.g., hydrochloric acid or sulfuric acid), and the benzidines thus obtained are recovered in the form of a salt of the acid or in the form of the free benzidine base which is obtained by reacting the salt with an alkali.

The crude benzidine salts ordinarily obtained by such commercial procedures are contaminated with by-products and impurities as well as considerable tarry material. In order to purify them, the crude benzidine salts are subjected to various purification treatments, such as the process of U.S. Patent 2,123,710 or a treatment which includes dissolving them in hot dilute acid, treating with an absorbent purifying agent (e.g., activated carbon), separating the purified solution from the absorbent which contains the tars and other impurities, and recovering the purified benzidine salt as such or converting it to the free benzidine base.

The benzidines are important intermediate chemical compounds for the manufacture of commercial products and especially dyestuffs and pigments. For commercial utilization as intermediates, it is desirable that they be relatively free from discoloration and insoluble materials.

As ordinarily prepared, benzidine salts rapidly discolor during the course of manufacture, and during storage and shipment even when packed in closed, but not airtight, containers. Thus, 3,3'-dichloro-benzidine hydrochloride (3,3'-dichloro-4,4'-diaminobiphenyl hydrochloride) which comes into commerce in the form of a moist press-cake containing 10%–15% water, rapidly develops a gray discoloration, and when dissolved in water forms a brown turbid solution. Similarly ortho-dianisidine hydrochloride (3,4'-dimethoxy-4,4'-diaminobiphenyl hydrochloride), which comes into commerce in the form of a dry powder rapidly changes from white or gray to a very dark gray to purple during storage. Such deterioration renders them unsuitable for use in making dye pigments.

Even after purification by usual methods (e.g., treatment of acid solutions thereof with activated carbon) the benzidine salts contain small amounts of impurities which promote their deterioration and the formation of colored and insoluble products when exposed to the atmosphere, in the form of aqueous solutions or of moist or dry products, during processing or storage.

It has heretofore been attempted to overcome the objectionable development of discoloration and/or formation of insoluble material by subjecting the benzidine salts to repeated purification procedures of the above type. While such treatment results in an initial product which has good color and solubility, such procedure is costly and wasteful and merely delays or minimizes the development of discoloration during storage.

It has also been proposed to include a reducing agent in the reaction mixture during the production and recovery or purification of the benzidine salts. Thus it is known to add zinc to the acid medium in which the hydrazobenzenes are rearranged to benzidines, or to the acid solutions from which the benzidines are recovered or purified. While such additions lead to a product of improved initial color, they do not prevent the development of discoloration during storage of the resulting benzidine salts.

A primary object of the present invention is to provide benzidine salts of improved stability, and especially with relation to the development of discoloration and/or formation of insoluble compounds on storage.

Further objects of the present invention are to provide methods for preventing or minimizing the deterioration of benzidine salts and for improving the stability of benzidine salts against the development of discoloration during manufacture and/or storage.

Other objects in part will be obvious and in part will appear hereinafter.

According to the present invention, a small amount of thiourea is incorporated with a salt of a benzidine with a strong mineral acid, to effect increased stabilization of the benzidine salt. I have discovered that benzidine salts which rapidly discolor on standing in contact with the atmosphere are rendered stable when stored for long periods of time by having thiourea incorporated with them. The amount of thiourea required will vary with the individual benzidine salt and its purity and method of manufacture. In general, the amount required is within the range 0.01% to 1%, and is usually less than 1%, of the weight of the benzidine salt. Preferably, an amount of thiourea between about 0.01% and 0.1% of the weight of the benzidine salt is incorporated with the benzidine salt to stabilize it against deterioration on storage as a dry or moist product, although amounts less than 0.01% are effective in some cases.

The exact technique employed in effecting the incorporation of thiourea with the benzidine salt can be varied as desired. Thus thiourea can be added in the dry form or as a solution to the benzidine salt in the dry form, moist form, or in the form of a slurry or solution. In general, it is preferred to admix the thiourea with aqueous solutions or slurries of the benzidine salts during their manufacture, to insure a uniform distribution of the stabilizer throughout the final product. Such a procedure also has the advantage of protecting the benzidines during manufacturing operations (e.g., in the rearrangement of the hydrazobenzenes to the corresponding benzidines, and/or purification of the benzidine compounds) where they are often exposed to the harmful effects of the atmosphere at elevated temperatures. In such a procedure, the amount of thiourea required to be added to the aqueous solution or suspension is relatively high to offset loss thereof due to solubility in the filtrate; and it is great enough to insure that the final benzidine product isolated therefrom contains a sufficient amount of thiourea to provide the desired stabilization effect. Benzidine salts stabilized with thiourea according to my invention can be stored for periods of six months to a year and longer, without noticeable discoloration or formation of undesirable amounts of insolubles.

The invention will be illustrated by the following specific examples, but it is to be understood that the invention is not limited to their details and that changes may be made without departing from its scope. The temperatures are in degrees centigrade and the parts and percentages are by weight unless designated as parts by volume. Where parts are by volume, the amount signifies the volume occupied by the same number of parts by weight of water at 4° C.

EXAMPLE 1

*Part A.—Production of 2,2'-dimethoxy-hydrazobenzene.*—A solution was prepared by adding sodium hydroxide (252 parts) slowly to methyl alcohol (1030 parts) with agitation and cooling so that the temperature was held below 50°. The solution was cooled further and 50% hydrogen peroxide (0.7 part) and o-nitrochlorobenzene (630 parts) were added, holding the temperature below 35°. The mixture was warmed to successively higher temperatures and held at temperature as follows: 4 hours at 40°, 4 hours at 50°, 4 hours at 60°, and 20 hours at 65-67°. The mixture was cooled to 40°, charged with 80 parts of sodium hydroxide and held at 50-55° for 4 more hours. To the resulting slurry of o-nitro-anisole (2-methoxynitrobenzene) was added a reduction promoter of the type claimed in U.S. Patent 2,765,301, made by adding 1,4-naphthoquinone (20 parts) and sodium hydrosulfide (14 parts of the 70% commercial flakes) to methyl alcohol (100 parts), refluxing for one hour and cooling to 20-30°. Then 252 parts of flake sodium hydroxide were added in increments to the mixture—76 parts initially and 40-50 parts at two hour intervals, the slurry temperature being lowered to 50° for each addition but maintained at 55-60° between additions and for 8-16 hours thereafter. The resulting slurry was cooled to 45°, and further reduction to the hydrazo compound was effected at said temperature by adding commercial corn sugar (240 parts of "Cerelose") slowly over a six hour period, agitating the slurry for another three hours, adding paraformaldehyde (50 parts added in 10 part increments over a two and one-half hour period), and continuing the agitation of the slurry for an additional half hour. The melting point of a sample of the resulting crystals of hydrazoanisole(2,2'-dimethoxyhydrazobenzene) was determined, as a test of completion of the reduction. (When below 100°, more paraformaldehyde was added as necessary to produce crystals melting at 100-103°). The finished reduction slurry was mixed with 1,000 parts of water, heated to 75° for one hour to improve crystal size, and then was drowned in 5,000 parts of cold water. After cooling to room temperature, the mass was filtered and the filter-cake of 2,2'-dimethoxy-hydrazobenzene was washed alkali-free.

*Part B.—Production of 3,3'-dimethoxy-benzidine sulfate.*—From the filter-cake produced in Part A of this example, a slurry containing 244 parts of 2,2'-dimethoxy-hydrazobenzene and 1400 parts of water was prepared by adding to water and stirring. Three parts of zinc and 4 parts of thiourea were added to the slurry, the mixture was cooled to 0-5°, and 300 parts of 50° Bé. sulfuric acid were added with agitation while keeping the temperature below 10°. Agitation of the slurry at this temperature was continued for 48 hours, whereupon the solids were isolated by filtration. The crude 3,3'-dimethoxy-benzidine sulfate, thus prepared, was made up to 2800 parts with water; 180 parts of 20° Bé. hydrochloric acid and 7 parts of thiourea were added, and the slurry was heated to 90-95° to effect complete solution, except for insoluble impurities. Ten parts of zinc were added over 2 hours, whereby the solution was almost decolorized, 20 parts of activated carbon ("Nuchar C190 Neutral") were added, and after one hour of agitation at 90-95° the carbon and insolubles were removed by filtration. The filtrate was salted with 300 parts of sodium chloride, cooled, and the solids were isolated on a filter. The filter-cake of 3,3'-dimethoxy-benzidine hydrochloride so obtained was washed with a 10% aqueous sodium chloride solution containing 0.2% thiourea until the washings were sulfate free.

After storage for 6 months, the moist cake thus obtained was only slightly darkened and produced clear, substantially colorless aqueous solutions.

*Part C.*—The process of Part B of this example was carried out without the addition of thiourea but otherwise in essentially the same manner. The resulting moist cake of 3,3'-dimethoxy-benzidine hydrochloride had darkened substantially after storage for six months, and produced dark colored solutions in water.

EXAMPLE 2

*Part A.*—A moist cake of 3,3'-dimethoxy-benzidine dihydrochloride (220 parts, equivalent to 170 parts of 100% 3,3'-dimethoxy-benzidine), obtained by the method of Example 1, Part B, was diluted to 3000 parts with water. Six parts of thiourea were added and the mixture was heated to 90-95°, which temperature was maintained during the purification and processing. When solution was effected, 9 parts of activated carbon were added and, after agitation for one hour, the carbon was removed by filtration. Sodium hydroxide (160 parts of 50° Bé. sodium hydroxide solution) was added to the hot filtrate and, after agitation for one hour, the solution was cooled to 30°. The crystal mass of 3,3'-dimethoxy-benzidine which separated upon cooling was isolated on a centrifuge and washed with a 0.2% aqueous solution of thiourea until it was alkali-free to phenolphthalein. The centrifuge cake was then vacuum dried at 5-10 mm. pressure and 50°.

After storage for six months, the dry product thus obtained was only slightly darkened and produced clear, substantially colorless solutions in dilute aqueous hydrochloric and sulfuric acids.

*Part B.*—The process of Part A of this example was carried out without the addition of thiourea but otherwise in essentially the same manner. The resulting dry powder of 3,3'-dimethoxy-benzidine had darkened substantially after storage for six months, and produced dark colored solutions in dilute aqueous hydrochloric and sulfuric acids.

EXAMPLE 3

*Part A.—Production of 2,2'-dichloro-azoxybenzene.*—o-Nitro-chlorobenzene (630 parts), water (960 parts) and 2,3-dichloro-1,4-naphthoquinone (8 parts) were emulsified at a temperature of 50-60° by agitation with addition of a small amount of kerylbenzene sodium sulfonate dispersing agent (0.5 part of "Nacconol NR"). The mixture was cooled to 40-45° and maintained in that temperature range throughout the remainder of the reduction to the azoxybenzene. Sodium hydroxide solution (720 parts of 50° Bé. caustic soda) was added, then formaldehyde (519 parts of 37% formaldehyde) was introduced dropwise over a period of one to two hours, and agitation was continued an additional hour. The setting point of a sample of the resulting crystals of 2,2'-dichloro-azoxybenzene was determined, as a test of completion of the reduction. (When below 55°, 8 parts of 37% formaldehyde are added for each 1° below the setting point of 55° and the mixture is agitated for another hour). The slurry was cooled and the 2,2'-dichloroazoxybenzene was filtered off, washed alkali-free, and dried.

*Part B.—Production of 2,2'-dichloro-hydrazobenzene.*—2,2'-dichloro-azoxybenzene (523 parts), prepared as described in Part A of this example, was refluxed with methyl alcohol (1270 parts) for a few minutes, and then the mixture was cooled to 40–45° and maintained in this temperature range throughout the remainder of the reduction to the hydrazobenzene. 2,3-dichloro-1,4-naphthoquinone (8 parts) was added and then corn sugar (280 parts of "Cerelose") and sodium hydroxide flakes (230 parts) were charged with agitation as follows: the corn sugar was added in three portions at 3 hour intervals, an initial charge of 100 parts followed by two charges of 90 parts each; the sodium hydroxide was added in 23 portions of 10 parts each at 30 minute intervals. Agitation was continued for another two hours. The melting point of a sample of the resulting 2,2'-dichloro-hydrazobenzene crystals was determined as a test of completion of the reduction. (When below 88°, 10 parts each of corn sugar and sodium hydroxide are added and the agitation is continued for an additional hour, these supplementary additions being continued until the melting point of the crystals is 88° or above). The slurry was steam distillation and the 2,2'-dichloro-hydrazobenzene was filtered off and washed alkali-free.

*Part C.—Production of 3,3'-dichloro-benzidine hydrochloride.*—The wet filter-cake of 2,2'-dichloro-hydrazobenzene prepared in Part B of this example was diluted with water (to a volume of 1700 parts) and cooled to 0–10°. Hydrochloric acid (1800 parts by volume of 20° Bé. acid) was added while cooling to prevent the temperature from exceeding 10°. The mixture was agitated for 16 hours at 0–10°, for 24 hours at 20–30°, and then for 2 hours at 80°. The slurry was then cooled and filtered. The filter-cake of 3,3'-dichloro-benzidine dihydrochloride thus obtained darkened rapidly on standing and, after storage for six months, gave turbid discolored solutions when dissolved in water.

*Part D.—Stabilized 3,3'-dichloro-benzidine hydrochloride.*—A rubber-lined tank was charged with 1000 parts of water and 180 parts of 20° Bé. hydrochloric acid. Then 165 parts of the filter-cake of crude 3,3'-dichlorobenzidine dihydrochloride obtained as described in Part C of this example (equivalent to 110 parts of 100% 3,3'-dichloro-benzidine) were added, and the resulting slurry was heated to 90–95° and diluted to 2000 parts with water, to effect complete solution except for insoluble impurities. Two parts of thiourea were added, and then 4 parts of zinc were added over 2 hours, whereby the solution was almost decolorized. Five parts of activated carbon were added, and after agitation for an hour at 90–95°, 2 parts more of thiourea were added. The liquid was then filtered to remove carbon and other insolubles and 1 part of thiourea and 200 parts of sodium chloride were added to the hot filtrate, which was then cooled to 25°. The solid portion of the resulting slurry was separated on a centrifuge.

The moist centrifuge cake of 3,3'-dichloro-benzidine dihydrochloride thus obtained was nearly white in color. It contained the equivalent of 60–70% of 3,3'-dichlorobenzidine as 100% base. After storage for six months, it was only slightly darkened and produced clear substantially colorless aqueous solutions.

It will be realized by those skilled in the art that the invention is not limited to the details of the above specific examples, and that changes can be made without departing from the scope of the invention.

The present invention is generally applicable to the various benzidines, such as benzidine itself, its lower alkyl, lower alkoxy and halogen derivatives and the salts of benzidine and of said derivatives with acids.

Thus, the benzidines employed in the above specific examples may be replaced by other benzidines, which may be similarly stabilized by having a small amount of thiourea admixed therewith; as for example, benzidine, 3,3'-dimethyl-benzidine, 3,3'-diethoxy-benzidine, and their sulfates and hydrochlorides.

The use of zinc, employed in above Examples 1 and 3, is not essential to the obtainment of a stabilized benzidine, although its use is advantageous since it assists in the production of benzidines of good initial color. Its use has the additional advantage of completing the reduction of any azoxy- or azobenzenes or other oxidizing substances which may be present in the hydrazobenzenes subjected to the acid rearrangement or purification treatments. Thus, it may be omitted, especially when thiourea is included in the reaction mixture employed for the formation of the benzidines, or it may be replaced by other reducing agents.

I claim:

1. A benzidine salt selected from the group consisting of salts of benzidine, and of ortho- and meta-nuclear substituted lower alkyl, lower alkoxy and chlorine derivatives of benzidine, with strong mineral acids, which has been obtained by rearrangement of the corresponding hydrazobenzene with a strong mineral acid and which discolors upon storage and, as an inhibitor of discoloration, thiourea in a small amount which is at least 0.01% of the weight of said benzidine salt.

2. A benzidine salt as defined in claim 1 stabilized against discoloration upon storage by having incorporated therewith thiourea in an amount which is 0.01 to 1% of the weight of the benzidine salt.

3. A stabilized benzidine salt as defined in claim 1 wherein the benzidine salt is a salt of 3,3'-dimethoxy-4,4'-diaminobiphenyl with a strong mineral acid.

4. A stabilized benzidine salt as defined in claim 1 wherein the benzidine salt is a salt of 3,3'-dichloro-4,4'-diaminobiphenyl with a strong mineral acid.

5. A stabilized benzidine salt as defined in claim 1 wherein the benzidine salt is 3,3'-dimethoxy-4,4'-diaminobiphenyl dihydrochloride.

6. A stabilized benzidine salt as defined in claim 1 wherein the benzidine salt is 3,3'-dichloro-4,4'-diaminobiphenyl dihydrochloride.

7. The improvement in the method of producing a benzidine material selected from the group consisting of benzidine; ortho- and meta-nuclear substituted lower alkyl, lower alkoxy and chlorine derivatives of benzidine; and salts of benzidine and of said derivatives with strong mineral acids, by acid rearrangement of the corresponding hydrazobenzene, which comprises carrying out the acid rearrangement of the hydrazobenzene in a reaction medium containing a small amount of thiourea which is at least 0.01% of the weight of the resulting benzidine material.

8. The improvement in the method of producing a benzidine material selected from the group consisting of benzidine; ortho- and meta-nuclear substituted lower alkyl, lower alkoxy and chlorine derivatives of benzidine; and salts of benzidine and of said derivatives with strong mineral acids by acid rearrangement of the corresponding hydrazobenzene which comprises carrying out the acid rearrangement of the hydrazabenzene in a reaction mixture containing between about 0.01% and about 1.0% of thiourea based on the weight of the resulting benzidine material.

References Cited in the file of this patent

UNITED STATES PATENTS

| | | |
|---|---|---|
| 1,718,373 | Nelson | June 25, 1929 |
| 2,047,144 | Kharasch | July 7, 1936 |
| 2,130,322 | Kharasch | Sept. 13, 1938 |
| 2,472,868 | Tillitson | June 14, 1949 |
| 2,493,544 | Munday | Jan. 3, 1950 |
| 2,586,837 | Linch | Feb. 26, 1952 |

UNITED STATES PATENT OFFICE
CERTIFICATION OF CORRECTION

Patent No. 2,966,519                                December 27, 1960

Francis W. Cashion

It is hereby certified that error appears in the above numbered patent requiring correction and that the said Letters Patent should read as corrected below.

Column 1, line 72, for "(3,4'-" read -- (3,3'- --; column 5, line 24, strike out "mentary additions being continued until he melting point"; line 26, after "was" insert -- drowned in water, the methyl alcohol was removed by --.

Signed and sealed this 11th day of July 1961.

(SEAL)
Attest:

ERNEST W. SWIDER                                    DAVID L. LADD
Attesting Officer                                       Commissioner of Patents